United States Patent [19]

Hara

[11] Patent Number: 4,996,598

[45] Date of Patent: Feb. 26, 1991

[54] APPARATUS FOR PROCESSING VIDEO SIGNAL

[75] Inventor: Zenichiro Hara, Nagasaki, Japan

[73] Assignee: Mitsubishi Denki Kabushiki Kaisha, Tokyo, Japan

[21] Appl. No.: 381,945

[22] Filed: Jul. 19, 1989

[30] Foreign Application Priority Data

Nov. 2, 1988 [JP] Japan .................................. 63-276070

[51] Int. Cl.⁵ ............................................. H04N 5/262
[52] U.S. Cl. ........................................ 358/183; 358/22
[58] Field of Search ................ 358/183, 22, 145, 147, 358/160, 142, 141, 148; 371/10.1; 365/230.2; 370/77, 109, 85.1, 85.2

[56] References Cited

U.S. PATENT DOCUMENTS

| | | | |
|---|---|---|---|
| 4,636,858 | 1/1987 | Hague et al. | 358/147 |
| 4,729,022 | 3/1988 | Shibuya et al. | 358/142 |
| 4,839,728 | 6/1989 | Casey | 358/183 |
| 4,905,077 | 2/1990 | Ishii | 358/183 |
| 4,908,700 | 3/1990 | Ishii et al. | 358/183 |
| 4,930,014 | 5/1990 | Maeda et al. | 358/183 |

Primary Examiner—Howard W. Britton
Assistant Examiner—Michael Lee
Attorney, Agent, or Firm—Burns, Doane, Swecker & Mathis

[57] ABSTRACT

An apparatus for processing a video signal related to signal processing for use in superimposing a graphic image such as characters and patterns on a video signal, in which two buses being conventionally necessary for controlling displaying contents are decreased to a single bus over which the graphic image data and process control command are transmitted by time-division multiplexing at the timings in synchronism with the video signal, whereby its hardware structure is simplified and, in addition, it is made possible to perform smooth switching over between different display contents.

5 Claims, 7 Drawing Sheets

APPARATUS FOR PROCESSING VIDEO SIGNAL

BACKGROUND OF THE INVENTION

1. Field of the Invention

The present invention relates to an apparatus for processing a video signal for use in such a case where a graphic image such as a character and a pattern are displayed in superimposition on a video image of a continuous television signal or the like.

2. Description of the Prior Art

FIG. 1 is a block diagram showing a prior art apparatus for processing a video signal disclosed, for example, in Japanese Laid-open Patent Publication No. 60-136828. Referring to the figure, an input video signal VI is processed in a decoder 2 so that color signals are separated from it. The obtained color signals are digitized in an A/D converter 3 and stored in a first memory 4 as video image data in units of field or frame. Where, the first memory 4 includes a controlling circuit for controlling data input to and output from the memory. Meanwhile, a graphic image of characters, patterns, or the like is input through the use of a man-machine interface 5 and stored via a disc controller 8 in a disk 9 for storing graphic images. Further, contents, sequence, program, and the like of the display are input through the use of the man-machine interface 5 and stored in a program memory 7 for storing programs, and execution of such image displaying programs and the like are controlled by a CPU 6. A bus 10 as a program control channel is connected to interfaces for the parts which the CPU 6 needs to execute the programs A DMA bus 11 for transmitting graphic image data is connected to a second memory 12 for storing the graphic image data in units of field or frame. The video image data or the graphic image data selectively read from the first memory 4 or the second memory 12 respectively to a first bus 13 which is controlled by a bus controller 14, is delivered to an output unit 15 to convert into an output video signal VO and a required picture as the result of image processing is displayed on a display monitor 16.

Below will be described operation with reference to a conceptual drawing of FIG. 2 and an operating model drawing of FIG. 3. The input video signal VI continuously input to the apparatus is decoded and separated into color signals R, G, and B in the decoder 2 and these color signals are converted into digital signals in the A/D converter 3. Then, these digitized video signals are stored in the first memory 4. For example, an input video signal VI whose contents are as shown in a picture d of FIG. 2 is stored in the first memory 4 in real time.

On the other hand, graphic image data as shown in a picture e of FIG. 2 has been produced in the man-machine interface 5 and stored in the disk 9. The graphic image data is read according to an instruction from the CPU 6 and delivered to the DMA bus 11 through the disk controller 8. The delivered graphic image data is stored in the second memory 12 in units of field or frame. The first memory 4 and the second memory 12 output their data at the same scanning timing (speed). At this time, as shown in FIG. 3, a decision portion 23 judges whether or not there exists a transparent color portion P within the picture e of the graphic image data output from the second memory 12, and according to the result of the decision, turns on one of the switches 21 and 22 so that one of the data in the memory 4 and the memory 12 is selectively output to the first bus 13. More particularly, the decision portion 23, when the transparent color portion P of the graphic image data of the second memory 12 is encountered during the scanning, turns on the switch 21 and turns off the switch 22, so that the video image data from the first memory 4 is delivered to the first bus 13, and, when, conversely, any other portions than the transparent color portion P, turns off the switch 21 and turns on the switch 22 so that the graphic image data from the second memory 12 is delivered to the first bus 13. As a result, an output video signal VO corresponding to a picture f of FIG. 2 is output through the output unit 15, and thereby, the picture f formed by superimposing the graphic picture e upon the video picture d is displayed on the display monitor 16.

Further, in the apparatus of this sort, implementation of a variety of display techniques incorporating reducing (or enlarging) processing is necessary, and the data and control command signals (such as a reduction or enlargement ratio and a position of display) required in image processing are supplied from the CPU 6 through the bus 10.

Since the prior art apparatus for processing the video signal was structured as described above, the first and second memories 4 and 12 each require interfaces with both the bus 10 and the first bus 13, and the second memory 12 further requires an interface with the DMA bus 11. Therefore, there has been a problem that the hardware configuration becomes complex.

Further, when the picture f' of FIG. 4 is switched to the picture f" of FIG. 5, the timing of the switching between the graphic images is controlled by the DMA bus 11, while the timing of the switching between the video images is dependent on the command transmission speed of the CPU 6. Therefore, due to the difference between the timings of switching for both the images, there is produced, at the time of switching between different display contents, a temporal discrepancy between the switching of the video image and that of the graphic image. Thus, there has been another problem that the switching between the different displays cannot be performed smoothly.

SUMMARY OF THE INVENTION

The present invention was made to overcome the above described problems, and accordingly, an object of the present invention is to provide an apparatus for processing a video signal of which a hardware configuration is simple and a picture-to-picture switching characteristic is smooth.

To achieve the above described object, the apparatus for processing a video signal according to the present invention comprises; a single second bus which concurrently performs functions of the two buses that have conventionally been necessary for controlling contents of display, namely, the bus as the program control channel and the DMA bus; and a signal generating unit, in synchronism with the input video signal, for generating a signal controlling so that the graphic image data and the data and control command signals necessary for processing the video image data are transmitted to the second memory and the first memory, respectively, through the second bus by time-division multiplexing, namely, the former is transmitted during the scanning period of the input video signal and the latter is transmitted during the flyback period of the input video signal.

Other objects of the present invention will become more fully understood from the detailed description of the embodiments with reference to the accompanying drawings.

PREFERRED EMBODIMENTS OF THE INVENTION

Figure 1:
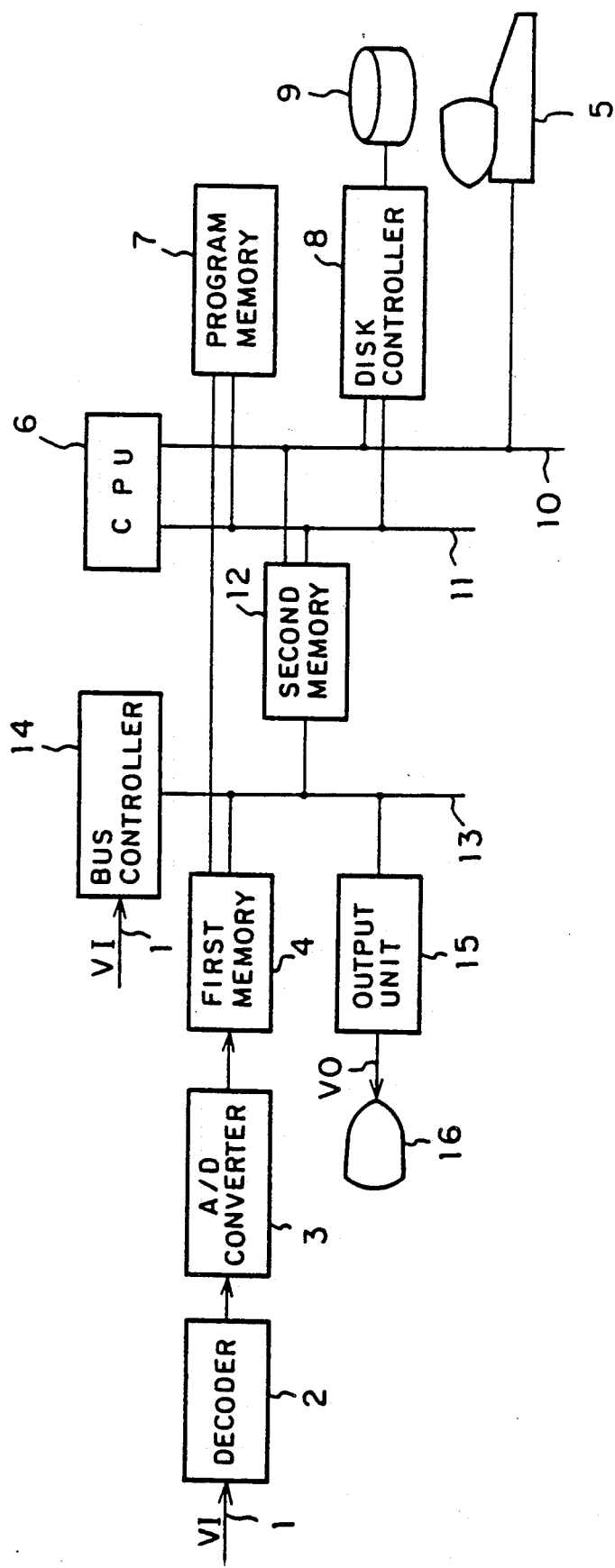
FIG. 1 is a block diagram showing a prior art apparatus for processing a video signal.
Figure 2:
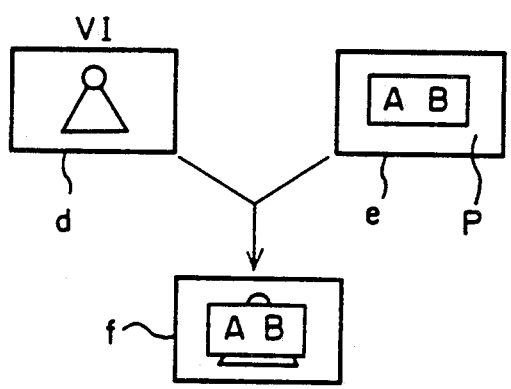
FIG. 2 is a drawing explaining a superimposing display performed in the same apparatus.
Figure 3:
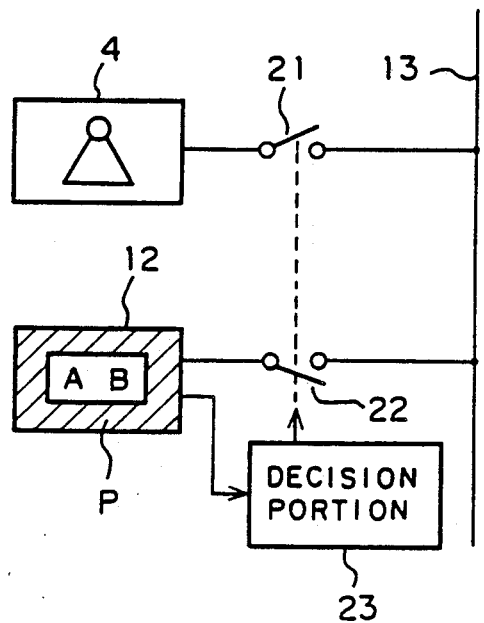
FIG. 3 is an operating model drawing of the same apparatus.
Figure 5:
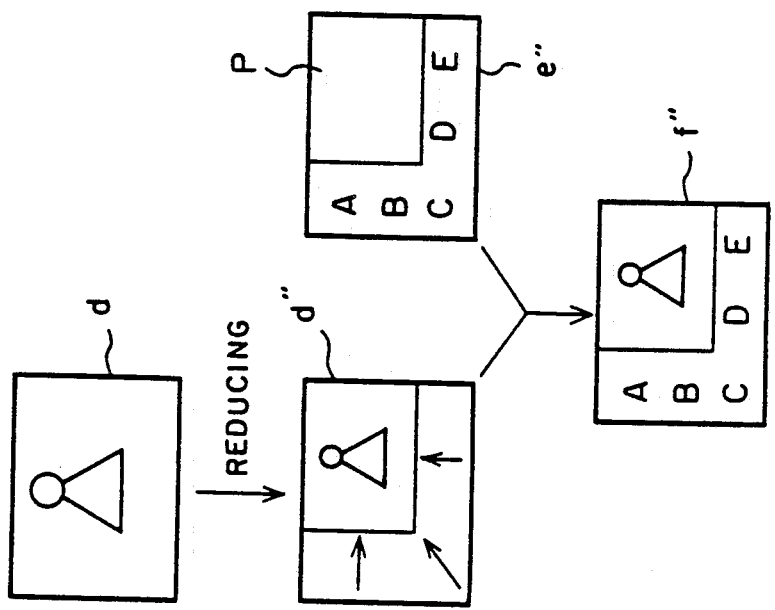
FIG. 4 and FIG. 5 are drawings for explaining image processing for reducing display of a video image in the same apparatus.
Figure 4:
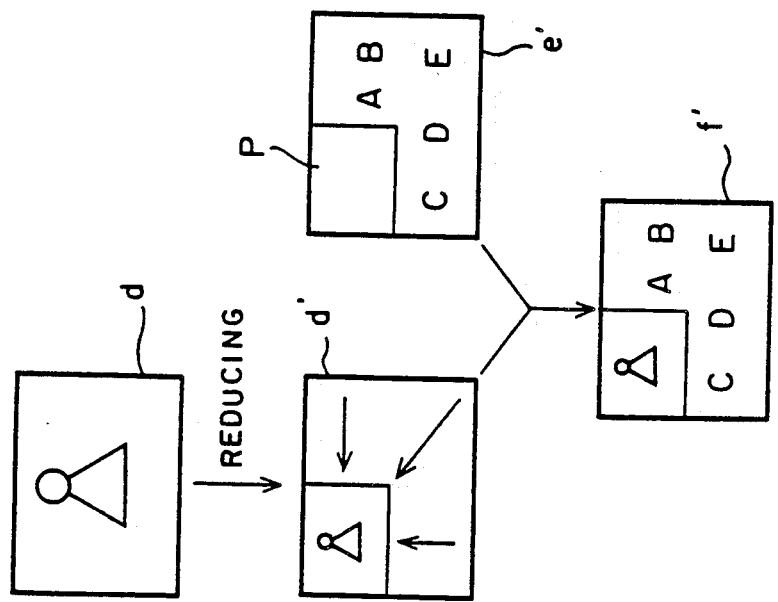
Figure 6:
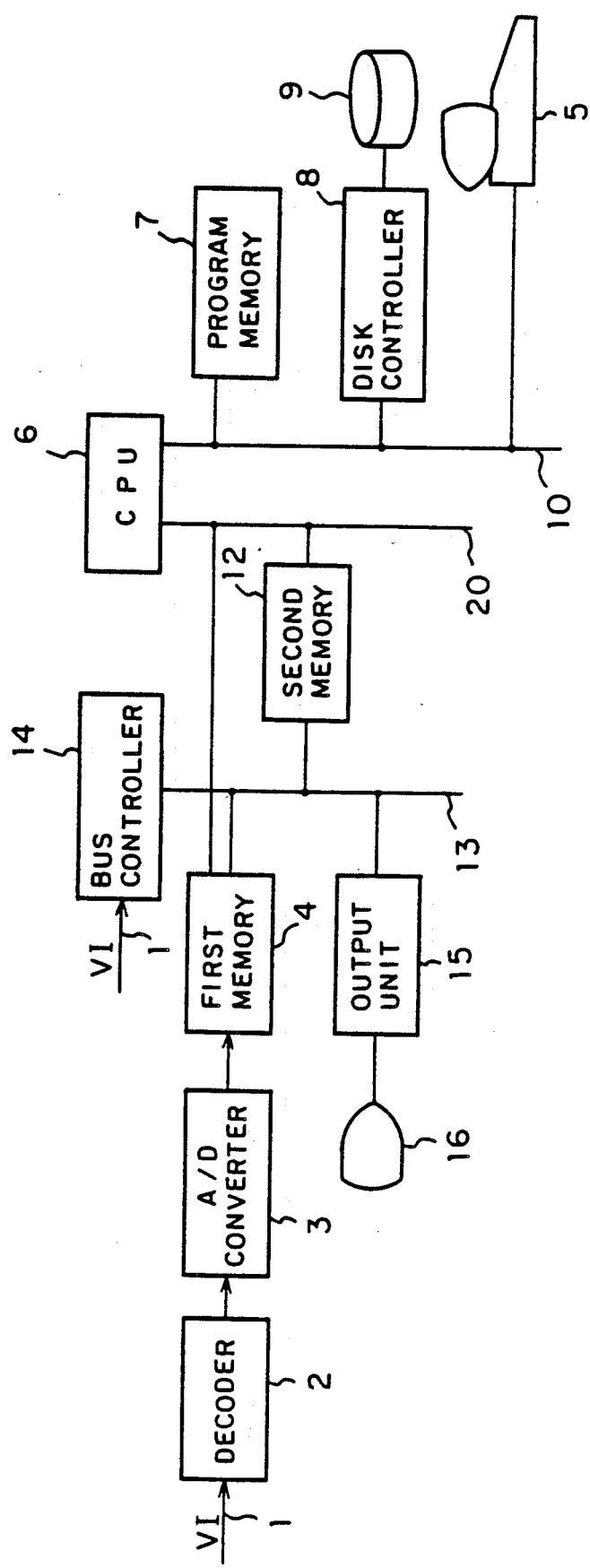
FIG. 6 is a block diagram showing an apparatus for processing a video signal according to an embodiment of the present invention.

A preferred embodiment of the present invention will be described below with reference to the accompanying drawings Parts in FIG. 6 corresponding to those in FIG. 1 are denoted by corresponding reference numerals and description thereof are omitted here. Reference numeral 20 denotes a second bus, and thereby, the arrangement of the bus 10 and DMA bus 11 in the prior art apparatus of FIG. 1 is omitted, and the first memory 4 and the second memory 12 which were connected to these buses 10 and 11 are both connected to the second bus 20. The second bus 20 is controlled by the CPU 6, and therefore, this CPU 6 also serves as the signal generating unit for controlling the second bus 20.

Figure 7:
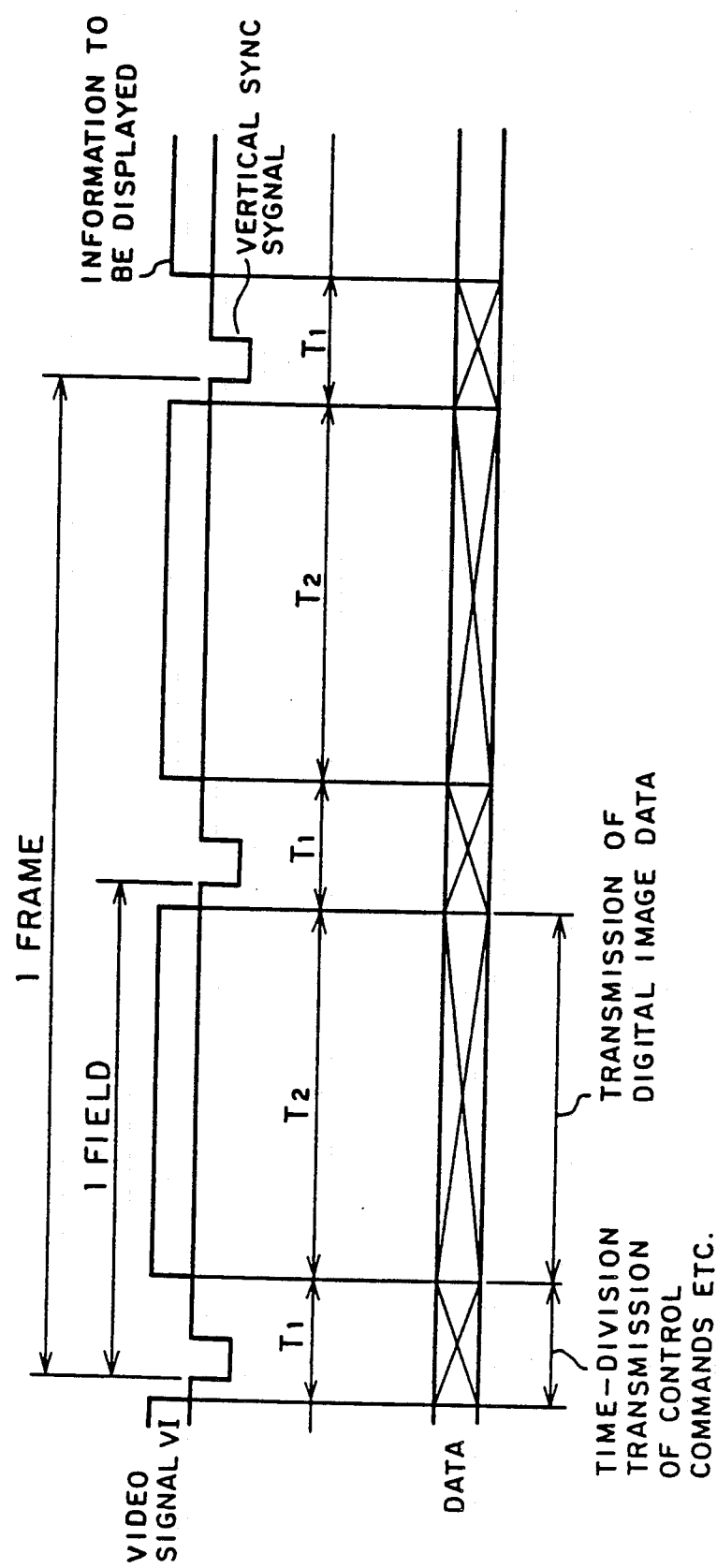
FIG. 7 is a timing chart showing operation of a second bus in the same apparatus.

Operation will be described below. In FIG. 7 is shown an outline of the timing for data transmission on the second bus 20. The graphic image data which was conventionally transmitted through the DMA bus 11 is transmitted through the second bus 20 at the timing corresponding to the video signal period (hereinafter to be called "scanning period") $T_2$ of the input video signal VI. Further, the data such as parameters required for reduction or enlargement of the input video signal VI and specifying the displayed position and other control command signals which were transmitted conventionally through the bus 10 are transmitted through the bus 20, the same as the graphic image data is transmitted, at the timing corresponding to the vertical blanking period $T_1$ of the input video signal VI (hereinafter, to be called "flyback period"), by time-division multiplexing. Hence, by supplying the command signals to the first memory and the graphic image data to the second memory through the second bus, the single second bus 20 performs the same functions as performed conventionally by the two buses 10 and 11. In addition thereto, in switching between different display contents, the switching control command signals are transmitted during the flyback period $T_1$ by multiplexing, and therefore, not only updating of the graphic image data but also processing of the video image data are finished within one field (1/60 sec.) so that smooth switching between different pictures can be attained.

The above described embodiment is adapted such that the second bus 20 concerned with display control and the bus 10 concerned with production of graphic image data or production of programs are controlled by a single CPU 6 and the control command signals and the like conventionally transmitted through the bus 10 are transmitted through the second bus 20. Hence, the point of this invention is the independence of the bus 10 from the display controlling portion, or more particularly, the point is that the overall apparatus, as shown in FIG. 8, is functionally and structurally dividable into a display block 40 and a control block 50 and these are connectable with each other through quite a simple, standardized interface 30.

Figure 8:
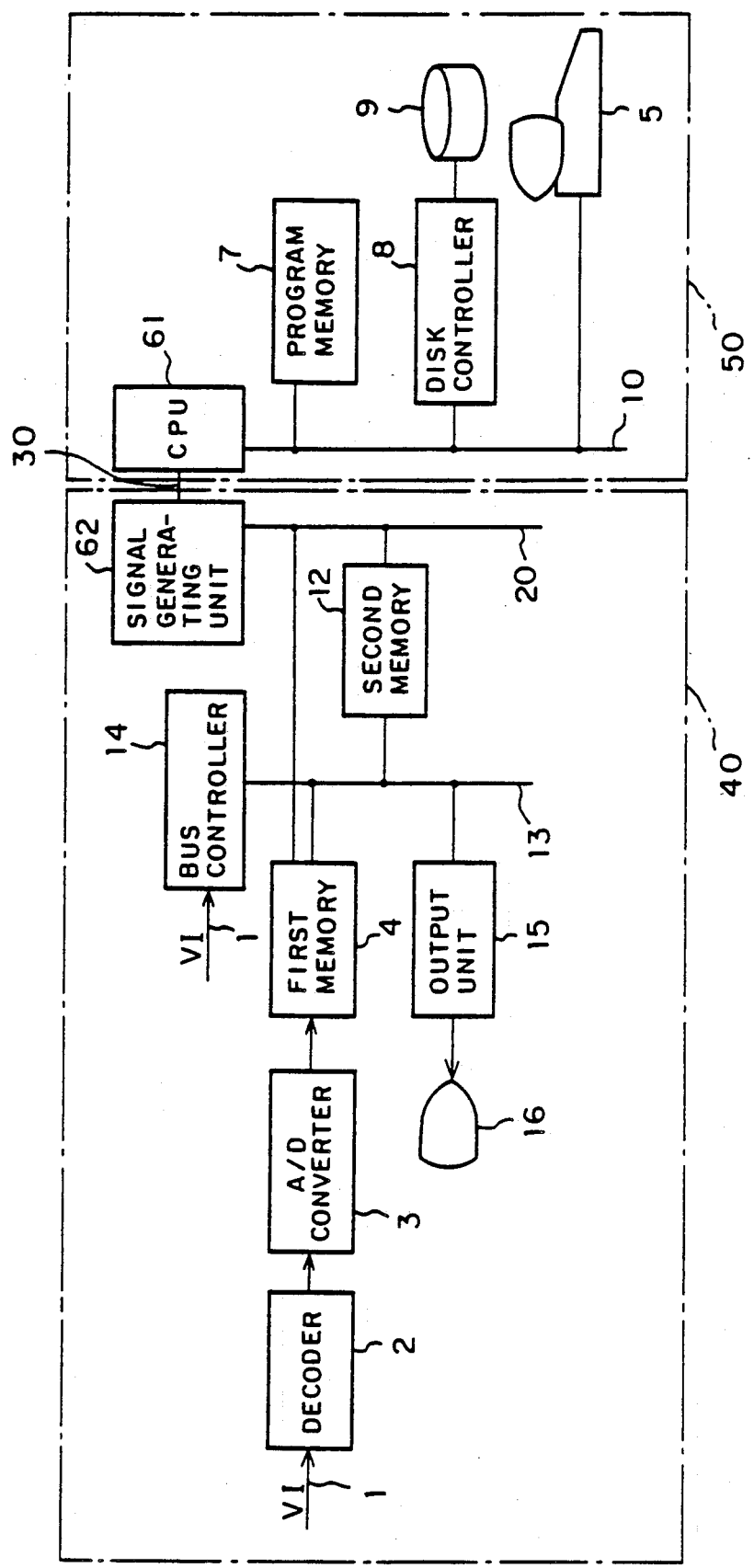
FIG. 8 is a block diagram showing an apparatus for processing a video signal according to another embodiment of the present invention.
Figure 9:
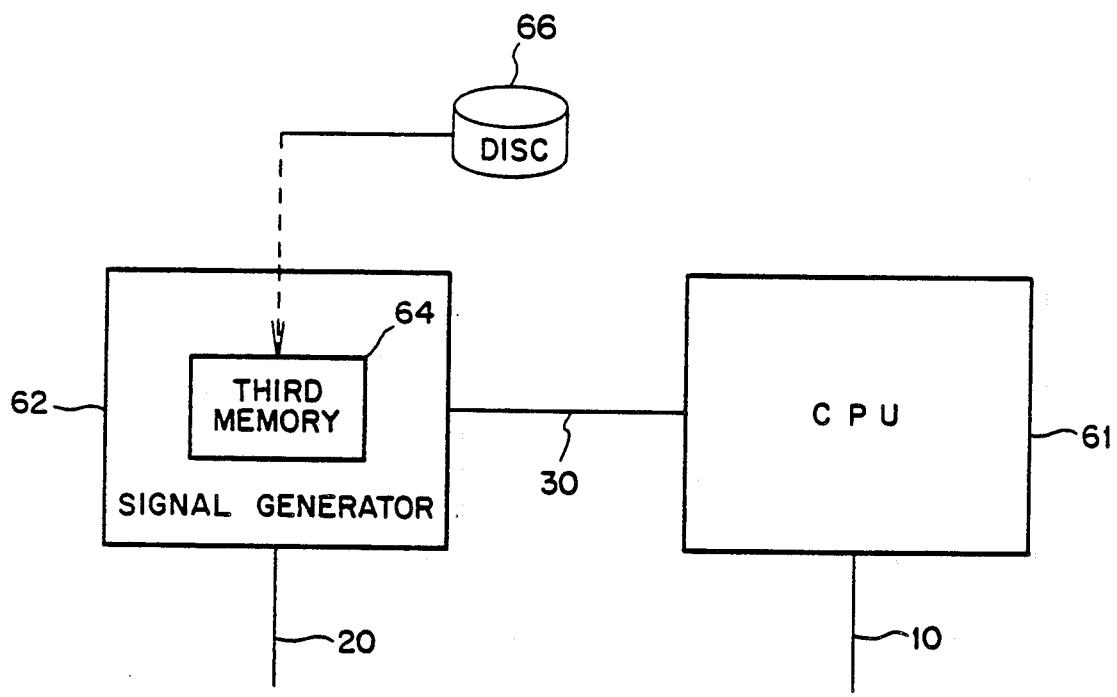
FIG. 9 is a more detailed block diagram of the signal generating unit.

Referring to FIG. 8, reference numeral 61 denotes the CPU provided in the control block 50, while reference numeral 62 denotes the signal generating unit, for controlling the second bus 20, provided in the display block 40, and it includes a third memory 64 for storing a plurality of graphic image data, as shown in FIG. 9. The interface 30 connects the CPU 61 to the signal generating unit 62. The signal generating unit 62 may be connected to a disk unit 66 for storing graphic image data. Further, general purpose hardware such as a personal computer may be used as the control block 50. Since the display block 40 no longer requires a bus dedicated to DMA, the hardware configuration shown in prior art FIG. 1 is simplified.

As described so far, since the apparatus for processing a video signal according to the present invention is adapted such that the graphic image data and such signals as the control command signals necessary for processing the video signal are transmitted over a single bus by time-division multiplexing and the timing of the transmission is synchronized with that of the video signal, such effects can be obtained that the hardware structure therefor can be simplified and switching over between different display contents can be performed therein smoothly.

What is claimed is:

1. An apparatus for processing a video signal comprising:
    a first memory for storing video image data obtained from a video signal;
    a second memory for storing graphic image data such as characters and patterns;
    a first bus connecting both said first and said second memories to a display and allowing for selective transmission of image data read from either of said first and said second memories to said display;
    a second bus, connected to both said first and said second memories, for transmitting said graphic image data stored in said second memory and control command data relating to processing said image data using time-division multiplex transmission; and
    a signal generating means for synchronously controlling the time-division multiplex transmission of data over said second bus such that said graphic image data are transmitted to said second memory during the scanning period of said video signal and said control command data are transmitted to said first memory during the flyback period of said video signal.

2. An apparatus for processing a video signal according to claim 1, wherein
said signal generating unit is connected to control means through a standardized interface and said control means is adapted to control said signal generating unit.

3. An apparatus for processing a video signal according to claim 2, wherein
said control means includes general-purpose hardware such as a personal computer.

4. An apparatus for processing a video signal according to claim 2, wherein
said signal generating unit has a third memory for storing graphic image data of plural frames.

5. An apparatus for processing a video signal according to claim 2 or claim 4, wherein
said signal generating unit has a disk unit for storing graphic image data of plural frames.

* * * * *